April 2, 1940. H. E. ECKLER 2,196,144
SERRATED RIVET
Filed June 3, 1938
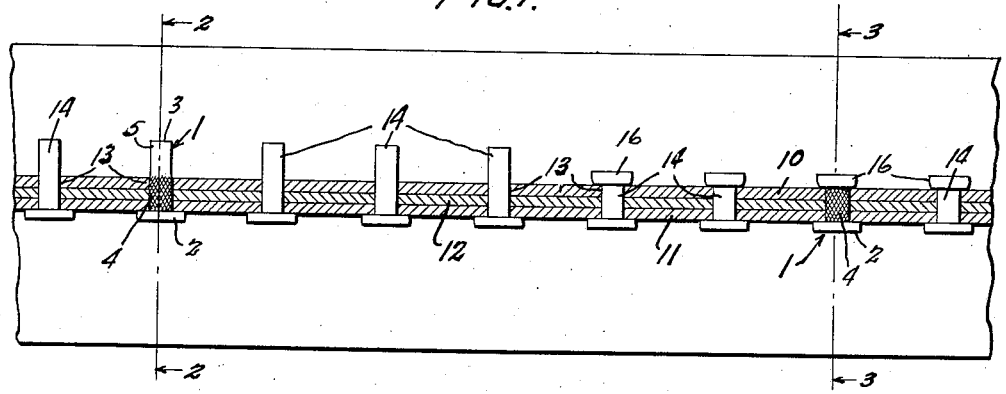
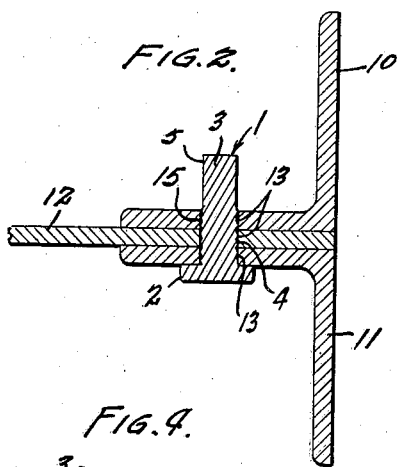
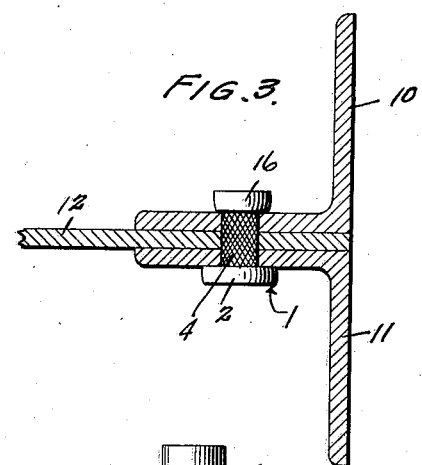
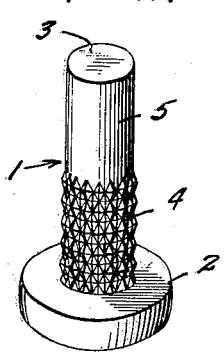
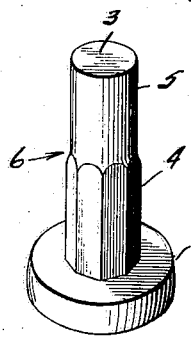
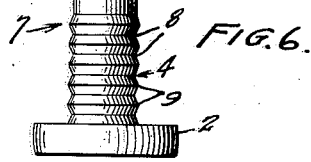
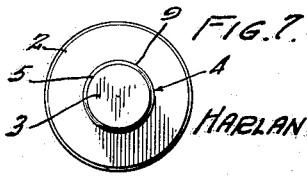
Inventor
HARLAN E. ECKLER
By Semmes, Keegin & Semmes
Attorneys Patented Apr. 2, 1940

2,196,144

UNITED STATES PATENT OFFICE 2,196,144

SERRATED RIVET

Harlan E. Eckler, Buffalo, N. Y., assignor to Bell Aircraft Corporation, Buffalo, N. Y., a corporation of New York Application June 3, 1938, Serial No. 211,679

4 Claims. (Cl. 85—37)

This invention relates to a rivet, and more particularly to a rivet, a portion of the shank of which is enlarged by serrations so as to make the rivet a drive fit when inserted in aligned holes formed in an assembly.

Hitherto, when it has been desired to fasten component parts together to form an assembly, it has been customary to provide means to temporarily hold these parts in position until the riveting has been completed. This is customarily accomplished by inserting self-tapping metal screws into a series of holes which are sufficiently spaced so that the parts may be securely held together by these temporary screws until rivets have been secured in the remaining holes. As soon as this preliminary riveting has been accomplished, the screws are withdrawn from the spotted holes, the holes are reamed out and permanent rivets inserted.

Another method which is occasionally employed to temporarily hold component parts of an assembly together involves the use of various adjustable clamping devices. These devices are cumbersome to operate and must also be removed after the riveting has been completed.

An object of my invention is to avoid the above-mentioned disadvantages of the prior art.

Another object of my invention is to provide a serrated device which may be used to hold the component parts of a structure together before riveting, and which will also serve as a rivet.

Yet another object of my invention is to provide a rivet consisting of a head and a shank, the portion of the shank adjacent the head being enlarged so as to make the rivet a drive fit in a rivet hole.

Still another object of my invention is to provide a method of riveting the component parts of an assembly together, by which the preliminary use of a removable holding device is eliminated.

With these and other objects in view, my invention broadly relates to the idea of providing a rivet, the shank of which is provided with an enlarged portion adjacent its head. This portion of the shank is enlarged by serrations of sufficient size to furnish a drive fit in a rivet hole.

The purpose of this rivet is twofold, it being used not only as a permanent holding device but also as a means of temporarily holding together the component parts of an assembly.

In the drawing:

Figure 1 is a longitudinal section taken through a fragment of metal fabrication disclosing a row of rivets, a number of which have been squeezed.

Figure 2 is a cross-sectional view taken along the line 2—2 of Figure 1 looking in the direction of the arrows.

Figure 3 is a cross-sectional view partly in elevation taken along line 3—3 of Figure 1 looking in the direction of the arrows.

Figure 4 is a perspective view of a rivet provided with diamond shaped knurling.

Figure 5 is a perspective view of a rivet, a portion of the shank of which is polygon in shape.

Figure 6 is a perspective view of a rivet which is provided with lateral knurling.

Figure 7 is an end view of the rivet shown in Figure 6.

As shown in Figure 4, my invention consists of a serrated rivet, generally designated by the numeral 1, which consists of a head 2 and a shank 3. The shank 3 includes a knurled portion 4 which is adjacent the head 2 and a smooth portion 5 located at the outer extremity of the shank 3.

The knurled portion 4 consists of a plurality of diamond shaped serrations which increase the diameter of the shank 3 to a size sufficient to make the knurled portion of the rivet a drive fit in a rivet hole. The diameter of the smooth portion 5, on the other hand, is approximately the diameter of the hole into which the rivet is to be driven. The head 2 may be formed in any desired shape.

A modification of this rivet is shown in Figure 5. This rivet, which is generally designated by the numeral 6, differs from the rivet 1 only in the fact that the enlarged portion 4 is formed by a plurality of plane surfaces. These surfaces are of approximately the same diameter as the smooth portion 5 of the rivet, the intersections of these plane surfaces forming the serrations which enlarge the shank 3 to a drive fit.

A third modification of my rivet is shown in Figure 6. This rivet, which is generally designated by the numeral 7, is constructed similarly to the rivet shown in Figure 4 except that the knurled portion 4 is provided with a series of laterally extending grooves 8, the grooving of which causes the metal to be thrown up to form the peripheral ridges 9. These ridges enlarge the portion of the shank adjacent the head and cause this portion to be a drive fit in a rivet hole.

As a means of illustrating the use of these rivets, structural members 10, 11 and 12 are shown in Figure 1 which are provided with rivet holes, as shown at 13. By driving serrated rivets into properly spaced holes, the structural members may be held securely together without the necessity of upsetting the rivet shank. Ordinary rivets may then be placed in the remaining holes, as shown at 14, and all the rivets squeezed in one riveting operation. Of course, if desired, only serrated rivets need be used for the riveting job in place of the ordinary rivets.

In order to temporarily hold the structural members 10, 11 and 12 together, the shank 3 of either the serrated rivet 1, 6 or 7 is driven into the standard rivet hole 13 by means of a hammer or other means, as best shown in Figure 2. During this operation the rounded portion 5 passes easily through the holes 13, but the outer edges of the serrations, being slightly larger than the hole, must be driven in, thereby compressing the enlarged portion of the shank and causing it to form a frictional engagement against the sides of the holes, as shown at 15 in Figure 2. This tight fit enables the rivet to hold the component parts 10, 11 and 12 together in proper alignment until the remaining rivets have been inserted. The smooth portion 5 of the shank 3 of all the modifications of the serrated rivet is adapted to be squeezed to form a head 16 during the riveting operation.

The length of the knurled portion 4, of the shanks of the various serrated rivets, is adapted to conform to the thickness of the several parts of the members being riveted together. In other words, the shank of the rivet is knurled except for a sufficient length to form a head on the inserted end.

From the above description it is believed apparent that, by the use of a serrated rivet, two methods have been provided by which structural members may be joined. In both methods all the holes in the component parts may be drilled to standard size and are, therefore, adapted for the use of my serrated rivet. However, if desired, my rivet may be used in only a selected number of properly spaced holes and ordinary rivets used in the remaining apertures. By the use of these serrated rivets, the component parts of a structure may be temporarily held together until all the rivets have been inserted. This enables all the rivets to be mechanically squeezed in one riveting operation.

While it is apparent that these serrated rivets may be made of any type of ductile alloys or metals, I have found that aluminum alloy is very satisfactory. This is especially true when the serrated rivets are to be used in connection with aircraft construction. The entire shank of the rivet is formed by annealing thereby providing an enlarged portion that may be easily compressed. The shape of the rivet and its length may be varied without departing from the concept of this invention.

While I have shown three modifications of my invention for purposes of illustration, it is obvious that the invention concept is not limited to these illustrated forms. I, therefore, wish only to be limited by the extent of the prior art and the scope of the appended claims.

I claim:

1. A rivet made of ductile metal which is designed to hold metallic component parts in frictional engagement by being driven into aligned apertures in the said component parts, comprising a head and a circular shank, the portion of the shank adjacent the head being enlarged by knurling, said knurled portion being approximately the same length as the combined widths of the component parts, and said knurling being adapted to collapse so as to frictionally engage the walls of the said apertures when the rivet is driven into operative position, the remainder of the shank being adapted to be formed into a head.

2. A rivet made of ductile metal which is designed to hold metallic component parts in frictional engagement by being driven into aligned apertures in the said component parts, comprising a head and a circular shank, the portion of the shank adjacent the head being enlarged by raised diamond-shaped knurling, said knurled portion being approximately the same length as the combined widths of the component parts, and said diamond-shaped knurling being adapted to collapse in order to frictionally engage the walls of the said apertures when the rivet is driven into operative position, the remainder of the shaft being adapted to be formed into a head.

3. A rivet made of ductile metal which is designed to hold metallic component parts in frictional engagement by being driven into aligned apertures in the said component parts, comprising a head and a circular shank, the portion of the shank adjacent the head being enlarged by lateral knurling, said knurled portion being approximately the same length as the combined widths of the component parts, and said lateral knurling being adapted to collapse in order to frictionally engage the walls of the said apertures when the rivet is driven into operative position, the remainder of the shank being adapted to be formed into a head.

4. A rivet made of ductile metal which is designed to hold component parts in frictional engagement by being driven into aligned apertures in the said component parts comprising a head and a circular shank, the portion adjacent the head being enlarged by knurling which forms a plurality of plane surfaces, the edges of which intersect, said knurled portion being approximately the same length as the combined widths of the component parts, and said knurling being adapted to collapse in order to frictionally engage the walls of the said apertures when the rivet is driven into operative position, the remainder of the shank being adapted to be formed into a head.

HARLAN E. ECKLER.